US004001671B2

United States Statutory Invention Registration [19]

[11] Reg. Number: H1671

Fishlowitz

[45] Published: Aug. 5, 1997

[54] METHOD FOR THE MANUFACTURE OF UNDERWATER FLOTATION SPHERES

[75] Inventor: Ely G. Fishlowitz, Silver Spring, Md.

[73] Assignee: The United States of America as represented by the Secretary of the Navy, Washington, D.C.

[21] Appl. No.: 916,740

[22] Filed: Jul. 22, 1992

[51] Int. Cl.[6] ..... B32B 31/00

[52] U.S. Cl. ..... 156/64

[58] Field of Search ..... 156/64, 292, 145; 364/227.4, 229.4, 224.7, 226.7, 917, 917.3, 917.4

[56] References Cited

U.S. PATENT DOCUMENTS 5,033,009 7/1991 Dubnoff ..... 395/148

*Primary Examiner*—Charles T. Jordan
*Assistant Examiner*—Meena Chelliah

[57] ABSTRACT

A method for the manufacture of underwater flotation spheres using a personal computer and spreadsheet linked to a numerical control machine is provided. Base data is entered into the spreadsheet and may be verified. Formulae for the design equations are entered and computed for each sphere with data in the spreadsheet. The results of the calculations are readily available and may be displayed in a graphical manner. Sphere design geometry is transmitted to the controller of a numerical controlled (NC) machine. The NC machine produces finished spheres.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

UNDERWATER FLOTATION SPHERE SPREADSHEET 11 13

| | A | B | C | D | E | F | G | H |
|---|---|---|---|---|---|---|---|---|
| 1-7 | NAME | RADIUS | THICKNESS | SPHERE DENSITY | SEA DENSITY | WGT; DSP RATIO | AIR WEIGHT | BUOYANCY |
| 8 | CURV10 | | | | | EQN | EQN | EQN |
| 9 | CURV15 | | | | | EQN | EQN | EQN |
| 10 | CURV20 | | | | | EQN | EQN | EQN |
| 11 | CURV25 | | | | | EQN | EQN | EQN |

16 14

| | I | J | K | L | M | N |
|---|---|---|---|---|---|---|
| 1-7 | INELASTIC COLLAPSE PRESSURE | ELASTIC BUCKLE STRENGTH | TRIAL PRESSURE | STRESS @ TRIAL PRESSURE | RO CONSTANT "B" | RO CONSTANT "N" |
| 8 | EQN | EQN | | EQN | | |
| 9 | EQN | EQN | | EQN | | |
| 10 | EQN | EQN | | EQN | | |
| 11 | EQN | EQN | | EQN | | |

15 14

| | O | P | Q | R | S | T |
|---|---|---|---|---|---|---|
| 1-7 | YOUNG MODULUS | RADIUS RATIO | MIDSURFACE RADIUS | LOCAL MID RAD | LOCAL OUTER RAD | SECANT MODULUS |
| 8 | | | EQN | EQN | EQN | EQN |
| 9 | | | EQN | EQN | EQN | EQN |
| 10 | | | EQN | EQN | EQN | EQN |
| 11 | | | EQN | EQN | EQN | EQN |

| | U | V |
|---|---|---|
| 1-7 | TANGENT MODULUS | NONLINEAR STRESS |
| 8 | EQN | EQN |
| 9 | EQN | EQN |
| 10 | EQN | EQN |
| 11 | EQN | EQN |

FIG. 1

UNDERWATER FLOTATION SPHERE SPREADSHEET 11 31

| | A | B | C | D | E | F | G | H |
|---|---|---|---|---|---|---|---|---|
| 1-7 | NAME | RADIUS | THICKNESS | SPHERE DENSITY | SEA DENSITY | WGT; DSP RATIO | AIR WEIGHT | BUOYANCY |
| 8 | CURV10 | 17 | 0.10 | 0.1597 | 0.0370 | 0.0757 | 57.7 | 703.8 |
| 9 | CURV15 | 17 | 0.15 | 0.1597 | 0.0370 | 0.1132 | 86.2 | 675.2 |
| 10 | CURV20 | 17 | 0.20 | 0.1597 | 0.0370 | 0.1506 | 114.6 | 646.8 |
| 11 | CURV25 | 17 | 0.25 | 0.1597 | 0.0370 | 0.1876 | 142.9 | 618.6 |

| | I | J | K | L | M | N |
|---|---|---|---|---|---|---|
| 1-7 | INELASTIC COLLAPSE PRESSURE | ELASTIC BUCKLE STRENGTH | TRIAL PRESSURE | STRESS @ TRIAL PRESSURE | RO CONSTANT "B" | RO CONSTANT "N" |
| 8 | 433 | 433 | 433 | 40583 | 162878.72 | 17.53 |
| 9 | 974 | 974 | 974 | 60933 | 162878.72 | 17.53 |
| 10 | 1716 | 1731 | 1716 | 80611 | 162878.72 | 17.53 |
| 11 | 2472 | 2706 | 2473 | 93051 | 162878.72 | 17.53 |

| | O | P | Q | R | S | T |
|---|---|---|---|---|---|---|
| 1-7 | YOUNG MODULUS | RADIUS RATIO | MIDSURFACE RADIUS | LOCAL MID RAD | LOCAL OUTER RAD | SECANT MODULUS |
| 8 | 18000000 | 1.1000 | 16.950 | 18.6450 | 18.6950 | 18000000 |
| 9 | 18000000 | 1.1000 | 16.925 | 18.6175 | 18.6925 | 17999826 |
| 10 | 18000000 | 1.1000 | 16.900 | 18.5900 | 18.6900 | 17982263 |
| 11 | 18000000 | 1.1000 | 16.875 | 18.5625 | 18.6875 | 17811662 |

| | U | V |
|---|---|---|
| 1-7 | TANGENT MODULUS | NONLINEAR STRESS |
| 8 | 17999996 | 1.00000 |
| 9 | 17996953 | 0.99991 |
| 10 | 17694061 | 0.99098 |
| 11 | 15185266 | 0.91367 |

FIG. 2

METHOD FOR THE MANUFACTURE OF UNDERWATER FLOTATION SPHERES

ORIGIN OF THE INVENTION

The invention described herein was made in the performance of official duties by an employee of the Department of the Navy and may be manufactured, used, or licensed by or for the Government, for any governmental purpose without payment of fees or any royalties thereon.

BACKGROUND OF THE INVENTION

1. Field of the Invention

The present invention relates generally to underwater vehicle buoyancy systems and in particular, to methods for the manufacture of flotation spheres used in these systems.

2. Statement of Prior Art

Hollow spheres have been used as an integral part of underwater vehicle buoyancy systems for a number of years. In order to design a sphere which meets design criteria including strength of the sphere, buoyancy, and weight in air, several sets of equations must be solved in an iterative process for each of the candidate spheres under consideration. The end solutions from each equation must then be compared and an appropriate sphere design selected.

Once the sphere design is selected, manufacture is accomplished by one of several methods. In one method, a skilled machinist enters the geometric data of the selected sphere into the Controller computer program of a numerically controlled (NC) machine. One such machine is the LeBlond Computer Numerical Control Lathe machine with a General Electric Mark Century 1050 controller. The NC machine, under the supervision of a skilled machinist, forms two finished hemispheres of the specified geometry from hollow rough-formed hemispherical forgings or castings. The two finished hemispheres are then joined by welding or gluing to form a finished flotation sphere.

In another method the skilled machinist uses geometric data directly. The machinist uses the geometric data with a lathe and template to form two finished hemispheres of the specified geometry from hollow rough formed hemispherical forgings or castings. The two finished hemispheres are joined by welding or gluing to form a finished flotation sphere.

Even with the use of calculators, the required computations for sphere design are very time intensive and the accuracy of the results is often adversely affected by human error during data entry and equation solving.

As a result, the prior art methods have continuing deficiencies in system solution time for sphere design, accuracy of design solutions, and complexity of choosing one sphere design from several candidate spheres.

SUMMARY OF THE INVENTION

Accordingly, it is an object of the invention to provide a method for the manufacture of underwater flotation spheres.

In accordance with the present invention, a method is provided for using a personal computer (PC) spreadsheet to solve the design equations. Known data is entered into the spreadsheet where it may easily be checked for accuracy. The spreadsheet is then used to calculate the values for the many design equations. The final results are presented in a form which simplifies selection of the desired sphere design from a group of candidate spheres. The use of a spreadsheet also allows the final results for the candidate group to be graphically displayed as well. Finally, the data are transmitted to the machining operation where two hemispheres are made and then joined to form the sphere.

BRIEF DESCRIPTION OF THE DRAWINGS

The foregoing objects and other advantages of the invention will be better understood from the following description taken with the accompanying drawings wherein like reference numerals refer to the same element throughout and wherein:

FIG. 1 is a view of the initial spreadsheet information used in calculating flotation sphere design geometry;

FIG. 2 is a view of the spreadsheet with data fill;

DETAILED DESCRIPTION OF THE INVENTION

Figure 3:
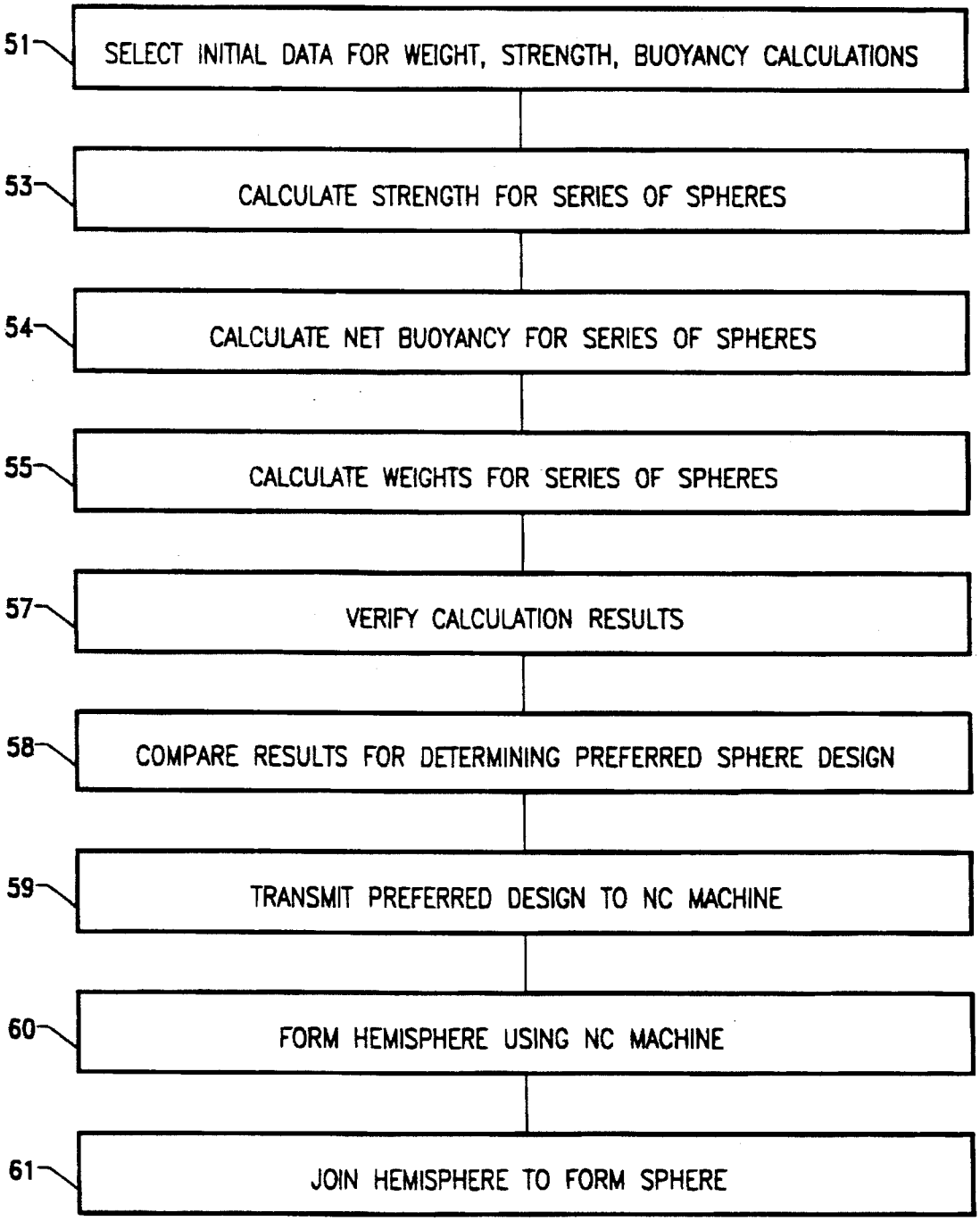
FIG. 3 depicts the steps in the manufacture of the flotation spheres.

Referring now to FIG. 1, spreadsheet calculations used in the Underwater Flotation Sphere Design system are shown. The spreadsheet consists of a matrix of boxes, each of which is filled either with an input value or an equation which computes a value. The first seven rows of each column (not shown) are used for labels which indicate the meaning of values of the cells in each column. Furthermore, the first column (column A) 11 is also used as a label field for identifying each sphere which is part of the candidate set, one candidate sphere per row.

The cells in the second through the fifth columns (B-E) 13, the eleventh column (K) 16, and the thirteenth through sixteenth columns (M-P) 14 are used for data input of the base values for each sphere which will later be needed for the design calculations. These base data values are the outside radius of the sphere in inches (column B), the shell thickness of the sphere in inches (column C), the density of the sphere material in pounds per cubic inch (column D), the density of seawater in pounds per cubic inch (column E), a trial pressure in pounds per square inch (column K), the Ramburg-Osgood constant "B" (column M), the Ramburg-Osgood constant "N" (column N), the Youngs Modulus of the material in pounds per square inch (column O), and the non-dimensional ratio of local to nominal mid-surface radius of the sphere (column P). The entry "EQN" 15 and other like entries represent a cell containing an equation as further detailed below.

The cell values in the remaining columns are calculated based on the entries in the rest of the spreadsheet. Each row x must have the following formulae entered in the cells in that row:

| Column | Formula (row x) | Value |
|---|---|---|
| F | (Dx/Ex)*(1–(((Bx–Cx)**3)/(Bx**3))) | Weight to Displacement Ratio |
| G | Fx*Ex*4.18879*Bx**3 | Air Weight of Sphere |
| H | (Ex*4.18879*Bx**3)*(1–Fx) | Buoyancy in Seawater |
| I | Vx*Jx | Inelastic Collapse Pressure |
| J | .84*Ox*((Cx/Sx)**2) | Elastic Buckling Pressure |
| L | (Kx*(Sx**2))/(2*Cx*Rx) | Stress at Trial Pressure |
| Q | Bx–.5*Cx | Nominal Midsurface Radius |
| R | Qx*Px | Local Midsurface Radius |
| S | Rx+.5*Cx | Local Outside Radius |

-continued

| Column | Formula (row x) | Value |
|---|---|---|
| T | Lx/((Lx/Ox)+(Lx/Mx)**Nx) | Secant Modulus |
| U | 1/((1/Ox)+(Nx/Mx)*(Lx/Mx)**(Nx−1)) | Tangent Modulus |
| V | (@SQRT(Tx*Ux))/Ox | Nonlinear Characteristic of Stress-Strain Curve |

There are several methods for entering these formulae. Each individual cell may either be entered with the appropriate value substituted for x or the first (row 8) equations may be entered and then copied through the use of the spreadsheet copy capability to each cell in the column. The spreadsheet copy will automatically change the value of x to reflect the correct row value.

Once the complete spreadsheet is entered into the personal computer, the spreadsheet may be used to develop a candidate set of flotation spheres from which a sphere design is selected. This will quickly and accurately solve the design equations for all candidate spheres which have data entered into the spreadsheet for them.

In operation of the spreadsheet, each row is one candidate sphere. For each candidate sphere it is necessary to iterate on the trial pressure, column K, in order to calculate the inelastic collapse pressure, column I. This iteration will be illustrated here referring to row 11 of FIG. 2. An initial trial pressure is input in column K, it is compared to the value computed in column I. Based on a comparison of these two pressures, a second trial pressure is input in column K and compared to the new value computed in column I. This iterative process continues until the trial pressure equals or closely matches the computed inelastic collapse pressure. In row 11, the final trial pressure of 2473 very closely matches the inelastic collapse pressure of 2472 for candidate sphere CURV25. All other calculated values, columns F, G, H, J, Q, R, S, T, U and V are computed directly and automatically upon inputing values in columns B thru E and M thru P. Any number of candidate spheres may be considered, one per row.

FIG. 2 shows the final output of the spreadsheet after computation. The values of the solved equations for the selected spheres in column A 11 may be simply compared by reading the values down a column. In this example, Air Weight 31 in column G ranges from 57.7 lbs to 142.9 lbs. Additionally, graphical displays of the various columns against each other can be generated by using the graphic functions of the spreadsheet. Computed values for a candidate sphere may be changed simply by entering new input data. The spreadsheet automatically recomputes the new values.

Referring now to FIG. 3, the sequence of steps required to manufacture the flotation spheres is depicted. Initial data selection 51 is made to provide a series of sphere solutions covering a range of design requirements. After initial data selection 51, strength calculations 53, net buoyancy calculations 54 and weight calculations 55 are completed for a series of spheres. Thereafter, results are verified 57 and compared 58, thereby allowing selection of the design geometry best suited to the particular requirement. The design geometry for the selected flotation sphere is automatically transmitted 59 to the controller computer program of a numerically controlled (NC) machine via a network that links the NC machine controller with the computer containing the spreadsheet.

The NC machine then forms two finished hemispheres 60 using the sphere design geometry to shape hollow, rough-formed, hemispherical forgings or castings. The two finished hemispheres are then joined 61 by welding or gluing to form a finished flotation sphere.

The advantages and benefits of the invention are numerous. The method allows rapid and accurate determination of sphere design. The method provides an automatic iterative feature requiring only initial data inputs. The method, further provides for automated and error-free transfer of design geometry to the numerical control machine. The method is literally hundreds of times faster than prior methods and avoids data entry and data transfer errors.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A method for the manufacture of underwater flotation spheres comprising the steps of:

a) selecting data for weight, strength and buoyancy calculations;

b) providing a computer and spreadsheet for entry of selected data and weight, strength and buoyancy equations;

c) computing and displaying strength for each sphere in a plurality of spheres;

d) computing and displaying the net buoyancy for each. sphere in a plurality of spheres;

e) computing and displaying the weights for each sphere in a plurality of spheres;

f) displaying all input data for verification;

g) displaying comparative data for determination of preferred sphere design;

h) transmitting selected sphere design geometry to the controller computer program of a numerically controlled machine via a network;

i) forming two finished hemispheres of the specified geometry by use of a numerically controlled machine; and j) joining the two finished hemispheres to form a finished flotation sphere.

2. A method for manufacture of underwater flotation spheres as in claim 1 wherein the step of providing a computer and spreadsheet comprises providing a personal computer having a spreadsheet program loaded.

3. A method for manufacture of underwater flotation spheres as in claim 1 wherein the step of computing and displaying strength further comprises the step of determining the elastic and inelastic buckling pressures and stresses.

4. A method for manufacture of underwater flotation spheres as in claim 1 wherein the step of computing and displaying net buoyancy comprises the further steps of:

a) determining weight-to-displacement ratio;

b) determining weight-in-air of a sphere; and c) calculating positive buoyancy.

* * * * *